(12) United States Patent
Dahlfort

(10) Patent No.: US 9,042,723 B2
(45) Date of Patent: May 26, 2015

(54) METHOD AND APPARATUS FOR FAULT DISCOVERY IN A PASSIVE OPTICAL NETWORK (PON)

(75) Inventor: Stefan Dahlfort, Santa Clara, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 767 days.

(21) Appl. No.: 13/266,218

(22) PCT Filed: Jan. 15, 2010

(86) PCT No.: PCT/SE2010/050037
§ 371 (c)(1),
(2), (4) Date: Oct. 25, 2011

(87) PCT Pub. No.: WO2010/126427
PCT Pub. Date: Nov. 4, 2010

(65) Prior Publication Data
US 2012/0039598 A1    Feb. 16, 2012

Related U.S. Application Data

(60) Provisional application No. 61/174,243, filed on Apr. 30, 2009.

(51) Int. Cl.
*H04B 10/08* (2006.01)
*H04B 10/00* (2013.01)
*G01M 11/00* (2006.01)
*H04B 10/071* (2013.01)

(52) U.S. Cl.
CPC ......... *G01M 11/3136* (2013.01); *H04B 10/071* (2013.01)

(58) Field of Classification Search
None
See application file for complete search history.

(56) References Cited

U.S. PATENT DOCUMENTS

2006/0110161 A1    5/2006    Cho et al.
2007/0217739 A1 *  9/2007    McGreer et al. ............. 385/32
2008/0005256 A1 *  1/2008    Shibayama et al. ........... 709/208
2008/0031624 A1 *  2/2008    Smith et al. ................... 398/71

FOREIGN PATENT DOCUMENTS

EP     0 546 707 A2       6/1993
EP     1 980 834 A1      10/2008
WO    WO 2010/010378 A1  1/2010

OTHER PUBLICATIONS

Chinese Office Action Corresponding to Chinese Patent Application No. 201080019452.4; Date of Issue: Dec. 30, 2013; Foreign Text, 6 pp., English Translation Thereof, 9 Pages.
PCT International Search Report issued on Aug. 2, 2010 for International Application No. PCT/SE2010/050037, filed Jan. 15, 2010 (4 pages).
http://lw.pennnet.com/display_article/315435/13/Art...netics:-Asia-Pacific-PON-vendors-see-sales-jump-50/ (1 of 4) [Apr. 20, 2009 14:36:08].

* cited by examiner

*Primary Examiner* — Darren E Wolf
(74) *Attorney, Agent, or Firm* — Myers Bigel Sibley & Sajovec, P.A.

(57) ABSTRACT

An apparatus and method for fault indication and localization in a Passive Optical Network (PON) comprising a multistage power splitter (100, 200, 300) with at least one 1:N splitter (120, 221, 222, 321, 322) followed by N items of 2:M splitters (131, 132, 231-233, 331-336), wherein N and M are integers greater than 1. The apparatus also comprises an Optical Time Domain Reflectometry (OTDR) device (110, 210, 310) capable of inserting an OTDR signal into the power splitter (100, 200, 300), and adapted to insert the OTDR signal between the first stage of the at least one 1:N splitter (120, 221, 222, 321, 322) and the second N items of 2:M splitters (131, 132, 231-233, 331-336).

9 Claims, 3 Drawing Sheets

METHOD AND APPARATUS FOR FAULT DISCOVERY IN A PASSIVE OPTICAL NETWORK (PON)

CROSS REFERENCE TO RELATED APPLICATION

This application is a 35 U.S.C. §371 national stage application of PCT International Application No. PCT/SE2010/050037, filed on 15 Jan. 2010, which published in the English language as International Publication No. WO 2010/126427 A1 on 4 Nov. 2010, which PCT International Application itself claims priority to U.S. provisional Patent Application No. 61/174,243, filed 30 Apr. 2009, the disclosures and contents of both of which are incorporated by reference herein in their entirety.

TECHNICAL FIELD

The present invention relates generally to a method and an apparatus for discovering a fault in a Passive Optical Network (PON). The discovering comprises indicating, identifying and locating a fault in a PON.

BACKGROUND

A Passive Optical Network (PON) is a point-to-multipoint fibre network architecture, in which unpowered (i.e. passive) optical splitters are used to enable a single optical fibre to serve multiple premises. A PON comprises at least one Optical Line Terminal (OLT) placed at the central office of the service provider and a number of Optical Network Terminations (ONT) near end users of the PON. More rarely, the OLT may be placed in an outside plant, e.g. at a street cabinet. One of the benefits of PONs is that the amount of fibre and the central office equipment required, can be reduced, as compared to point-to-point architectures. Another benefit of PONs is an anticipated much lower cost for field maintenance and fault management, as compared to metallic media networks. These costs are often referred to as "operational expenditures".

In order to achieve the lower operational expenditures, it is important to be able to easily detect any occurring faults in the PON. A fault detection or fault indication should enable the operator of the PON to ascertain if the fault occurs in the fibre network or in the end equipment, and what kind of fault it is (i.e. identification). It is also desirable to get an indication of what part of the fibre network and where in the fibre network the fault occurs (i.e. locating the fault).

In today's fault management solutions, Optical Time Domain Reflectometry (OTDR) is typically used. An OTDR device or OTDR instrument sends a short pulse down the fibre and detects the back reflection or back scattering from that fibre.

One important factor in optical fibre loss is the scattering of light.

The light is scattered in all directions in the fibre, including backwards, towards the source of light. The light that is scattered backwards towards the source of light, i.e. the back reflection or back scattering, is measured in the OTDR device or OTDR instrument. Depending on the condition of the fibre and the existence of any connectors and the like, the scattering varies as the light passes down the fibre, from having been sent out from the OTDR device/instrument. It is possible to calibrate the speed of the pulse as it passes down the fibre. By doing so, it is possible for the OTDR device/instrument to correlate what it "sees" in the back scattered or back reflected light with an actual location in the fibre. It is therefore possible to create a display of the amount of back scattered light at any point in the fibre.

By analysing the back scattered light, it is possible to detect any fault in the fibre, such as water intrusion, ageing, faulty connectors, splices, fibre bends, crunches on the fibre, and so on. Any such condition will affect the scattering of light.

The OTDR device or OTDR instrument is typically very expensive and therefore it is desirable to have as few OTDR devices as possible to perform the measurements and the analysis. It is also desirable to perform the measurements using the OTDR device in a centrally located office, not having to bring the device or instrument into the field. However, a PON comprises one or more power splitters, which are associated with high losses. Thus, the OTDR signal is weakened after double-passing these splitters making any localisation of a fault after such a splitter very difficult. The bigger the power splitter, the bigger the loss is associated with it. A PON typically comprises power splitters with a split ratio of 1:32 or higher, making the localisation of any fault following the splitter impossible. At best, it is possible to detect a fault, but impossible to locate it.

Also, an optical power measurement at the subscriber side may be employed to detect any changes in received power, but it will not be possible to find the cause of the fault nor the location of the fault.

The ONTs may also send status messages back to the central office, in order to detect faulty fibres, optical components or faulty ONTs. However, a status message will merely indicate that a fault may have occurred, but it will not be possible to find the cause of the fault nor the location of the fault.

SUMMARY

It is an object of the invention to address at least some of the problems outlined above. In particular, it is an object of the invention to enable discovery of a fault of a fibre in a Passive Optical Network (PON).

According to one aspect, an apparatus is provided, which comprises a multistage power splitter with at least one 1:N splitter followed by N items of 2:M splitters, wherein N and M are integers greater than 1. The apparatus further comprises an Optical Time Domain Reflectometry (OTDR) device, which is capable of inserting an OTDR signal into the power splitter. The OTDR device is adapted to insert the OTDR signal between the first stage of the at least one 1:N splitter and the second N items of 2:M splitters.

This arrangement has several advantages. One of the advantages is that the losses associated with each splitting operation can be reduced. The first splitting stage is skipped for the OTDR-signal and the losses associated therewith can be avoided. As a result, the OTDR-signal that is travelling down the fibres towards the ONTs may be stronger. Another advantage is that back reflection/scattering, indicating any possible fault(s), can be grouped together in smaller groups instead of back reflection coming to one place from all the ONTs.

According to an embodiment, the OTDR device is connected to an Optical Switch (OS) having one input connected to the output of the OTDR device and N*K outputs connected to the inputs of the N items of 2:M splitters, wherein K is the number of Optical Line Terminals (OLT).

This has the advantage that one OTDR device can be used for identifying and localising possible faults in fibres in several different PONs, in fact in K number of PONs.

According to an embodiment, the second splitter stage is of the type 2:M, wherein M≤16.

According to another embodiment, the second splitter stage is of the type 2:M, wherein M=8.

In one example, the power splitter is a Planar Lightwave Circuit (PLC) with integrated 2:M stages and the OTDR signal is inserted in the splitting chain so that M≤16.

In another example, the power splitter is a Planar Lightwave Circuit (PLC) with integrated 2:M stages and the OTDR signal is inserted in the splitting chain so that M=8.

According to an embodiment, the OTDR device is connected to a Wavelength Division Multiplexor (WDM) with a tuneable or multi-wavelength OTDR.

In one example, the WDM is an Arrayed Waveguide Grating (AWG) with a maintenance wavelength window of 1625-1675 nm.

According to another aspect, a method is defined for detecting a fault and for locating the fault in a Passive Optical Network (PON).

The method comprises arranging/connecting an Optical Time Domain Reflectometry (OTDR) device such that it is capable of inserting an OTDR signal into a power splitter of the PON. The power splitter is a multistage stage power splitter with at least one 1:N splitter followed by N items of 2:M splitters. The method further comprises inserting an OTDR signal between the first stage of the at least one 1:N splitter and the second N items of 2:M splitters. The method also comprises analysing the scattering in order to locate any possible fault in a fibre from the power splitter and the OLT.

According to an embodiment, the method further comprises connecting the OTDR-device to an input of an optical switch having N*K outputs. The outputs are connected to the inputs of the N items of 2:M splitters, wherein K is the number of Optical Line Terminals (OLT).

According an example, the power splitter is a Planar Lightwave Circuit (PLC) with integrated 2:M stages, and the method comprises inserting the OTDR signal in the splitting chain so that M≤16.

According to another example, the power splitter is a Planar Lightwave Circuit (PLC) with integrated 2:M stages (231-233), and the method comprises inserting the OTDR signal in the splitting chain so that M=8.

According to yet another embodiment, the method comprises connecting the OTDR-device to a Wavelength Division Multiplexor (WDM) with a tuneable or multi-wavelength OTDR.

BRIEF DESCRIPTION OF THE DRAWINGS

The invention will now be described in more detail by means of exemplary embodiments and with reference to the accompanying drawings, in which.

DETAILED DESCRIPTION

Briefly described, an apparatus and a method are provided for discovering a fault in a Passive Optical Network (PON).

As described above, OTDR signals are often used to detect faults in a fibre network. Also, the Optical Network Terminations (ONTs) may measure signal strengths and report these measurements back to a central office.

Below, an arrangement and a method for discovering a fault in a PON will be described. The discovering of a fault entails indicating that a fault has occurred and where on the fibre the fault has occurred, i.e. to locate the fault.

An example of how an apparatus may be realised or implemented will now be described with reference to FIGS. 1, 2 and 3.

Figure 1:
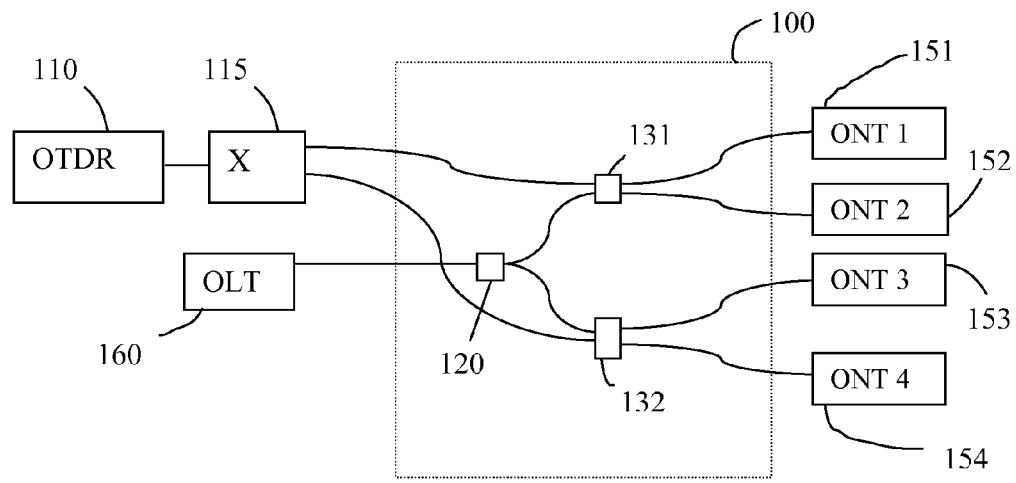
FIG. 1 is a schematic view of a two stage 1:4 splitter with the OTDR device connected according to an embodiment.

FIG. 1 is a schematic view of a two stage 1:4 splitter with the OTDR-device connected according to an embodiment.

FIG. 1 shows an example of an arrangement for fault discovery in a Passive Optical Network (PON). The arrangement comprises a two stage power splitter 100 with one 1:2 splitter 120 followed by 2 items of 2:2 splitters 131, 132. The arrangement also comprises an Optical Time Domain Reflectometry (OTDR) device 110 that is capable of inserting an OTDR signal into the power splitter 100. A switching arrangement 115 is provided between the OTDR device or instrument 110 and the power splitter 100. The OTDR device 110 is adapted to insert the OTDR signal between the first stage of the 1:2 splitter 120 and the second stage of two items of 2:2 splitters 131, 132. Further, there are four Optical Network Terminations (ONTs) 151, 152, 153 and 154. FIG. 1 also shows one Optical Line Terminal (OLT) 160. The OLT 160 is typically located at a central office of the service provider. The ONTs are arranged at locations near end users of the PON.

One of the advantages of arranging the OTDR device 110 such that it is capable of inserting an OTDR signal into the power splitter between the first and second splitting stage, is that the losses associated with each splitting operation can be reduced. The first splitting stage is skipped for the OTDR signal and the losses associated therewith can be avoided. As a result, the OTDR signal that is travelling down the fibres towards the ONTs will most likely be stronger. Another advantage is that back reflection/scattering, indicating any possible fault(s), can be grouped together in smaller groups instead of having back reflection supplied to one place from all the ONTs.

To clarify, instead of receiving all back reflection from all ONTs 151-154 in one bunch at the OTDR device 110 going through the whole power splitter on its way back, back reflection from ONTs 151 and 152 can be grouped together, and the back reflection from ONTs 153 and 154 can be grouped together. "Grouped together" means that the back reflection that is detected is the sum of the back reflection from ONTs 151 plus 152 in one group and back reflection from ONTs 153 plus 154 in one group. It is generally easier to extract and analyse information from a smaller group than from a larger group, which can be utilised in this solution. In this way, back reflection from the ONTs 151 and 152 may be analysed separately and back reflection from ONTs 153 and 154 may be analysed separately.

Also, the back reflection does not have to travel all the way through the power splitter 100, which can reduce losses associated with every splitting operation. In FIG. 1, the splitter 120 can be avoided, i.e. the first splitting stage. Since the back reflection may be both stronger from not having to pass through the whole power splitter, i.e. both the first and the second splitting stage, and since the back reflection from different ONTs are grouped together, more information can be extracted from the received back reflection. In this way, a fault can not only be identified and indicated more easily, but it can also be possible to locate where along the fibre the fault is located or has occurred.

Quite often, splitters of 1:32 are used comprising a first splitting stage of split 1:4 and a second splitting stage of split 2:8. The higher the split ratio, the more difficult it becomes to analyse and extract information from the back reflection or the scattering. The advantages of the invention becomes more evident the higher the split.

For splits higher than 2:16, it is difficult for today's OTDR devices to extract enough information as to determine the location of a fault along a fibre, due to the losses and the high number of ONTs that are grouped together. In such a split, back reflection from 16 ONTs are grouped together. For higher splits, it is possible to detect and indicate that a fault has occurred and it may be possible to indicate which fibre is faulty, but it may become difficult to ascertain exactly where the fault has occurred. Therefore, it may be preferable that the last splitter stage is of the type 2:M, where M≤16.

According to one embodiment, the last splitter stage is of the type 2:M, where M=8.

The splitter 100 that is shown in FIG. 1 can be an ordinary two stage splitter, wherein the OTDR signal is inserted between the first and the second stage. The splitter 100 in FIG. 1 can also be a Planar Lightwave Circuit (PLC) with integrated 2:2 stages.

By OTDR measurements it is meant measuring the back reflection or back scattering that occurs when an OTDR signal is sent down the fibres in the PON. As can be seen in FIG. 1, splitters 131 and 132 are 2:2 splitters. One input of each splitter 131 and 132 comes from the respective two outputs of splitter 120. The other input of each respective splitter 131 and 132 is connected to the OTDR device.

Figure 2:
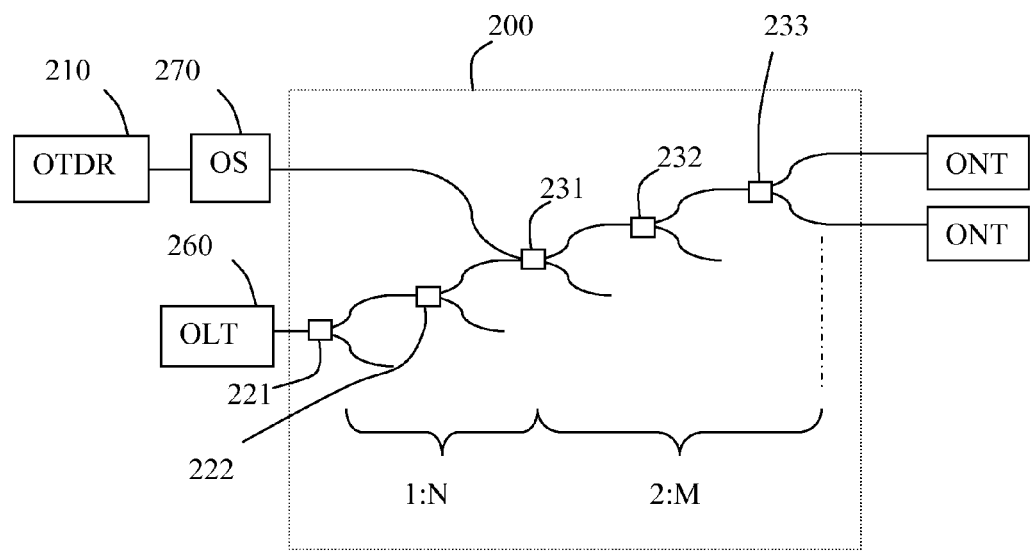
FIG. 2 is a schematic view of a Planar Lightwave Circuit with the OTDR device connected according to an embodiment.

FIG. 2 is a schematic view of a Planar Lightwave Circuit (PLC) with the OTDR device connected according to an embodiment of the arrangement. In a PLC, there are a number of cascade arranged splitters. It should be noted that FIG. 2 is merely schematic and some of the splitters in the PLC have been left out for simplicity. Moreover, it should be noted that PLC is not the only splitter technology that could be employed, although dominating today. This arrangement can be implemented with any type of splitter technology.

FIG. 2 shows an OTDR device 210 arranged to insert an OTDR signal into a power splitter 200, in this case a PLC 200. The OTDR-device 210 is adapted to insert the OTDR signal between the first stage of the 1:N splitters and the second 2:M splitters. FIG. 2 shows a PLC with cascade splitters 221, 222, 231, 232 and 233 of splits 2:2. In FIG. 2, only splitter 231 makes use of its two inputs, as one input is connected to the output of splitter 222 that is arranged before splitter 231 in the cascade. The other input of splitter 231 is connected to the OTDR device 210. The other shown splitters 221, 222, 232 and 233 make use of one input only. The first splitter 221 in the cascade has one input connected to an OLT 260 and splits the input in two. In FIG. 2, splitters 221 and 222 constitute a first splitting stage, here as a split 1:4. The splitters 231, 232 and 233 constitute a second splitting stage, here as a split 2:8. The whole PLC 200 consequently splits 1:32.

FIG. 2 also shows the OTDR being connected to an Optical Switch 270. This variant is optional and may be used in case the PON has a plurality of OLTs, each OLT being connected to a respective power splitter. This will be described in more detail below with reference to FIG. 3.

Figure 3:
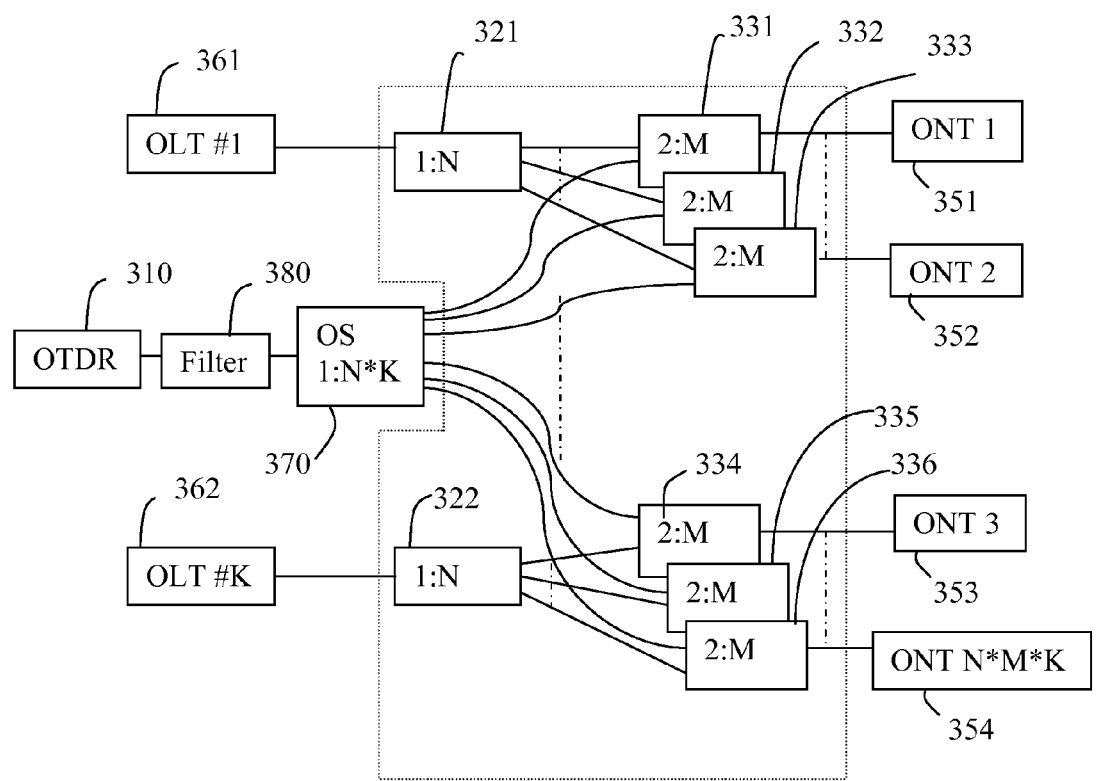
FIG. 3 is a schematic view of a number of K Optical Line Terminals (OLTs), an Optical Switch (OS), a two stage splitter and a number of N*M*K Optical Network Terminations (ONTs) with the OTDR-device connected according to an embodiment.

FIG. 3 is a schematic view of a number of K Optical Line Terminals (OLTs), an Optical Switch (OS), K number of two-stage-power-splitters and a number of N*M*K Optical Network Terminations (ONTs) with the OTDR-device connected according to an embodiment of the arrangement.

In FIG. 3, K number of two-stage-power-splitters are shown. It shall be noted that FIG. 3 is a schematic representation where some parts of the number of K power splitters have been left out for simplicity reasons. Also, FIG. 3 may give the impression that the K power splitters and stages are arranged at the same location, although this is not necessarily the case.

There are K number of OLTs 361, 362 each being connected to a respective power splitter. Each power splitter comprises a first stage of a 1:N splitter 321, 322 and N number or items of 2:M splitters 331-336. FIG. 3 also shows N*M*K number of ONTs 351-354 connected to the K number of power splitters.

FIG. 3 also shows an OTDR-device 310 connected to the K number of power splitters via an Optical Switch (OS) 370, optionally also via a filter 380. The OS 370 has one input and N*K number of outputs corresponding to the total number of N*K 2:M splitters 331-336. The OTDR signal is inserted in the OS 370, which transmits the signal further via its N*K number of outputs. The outputs of the OS 370 are each connected to one of the two inputs of each of the second stage 2:M splitters 331-336 respectively. The other input of the two inputs of each of the second stage 2:M splitters 331-336 is connected to one of the outputs of the first stage 1:N splitters 321 and 322 respectively. FIG. 3 also shows a filter 380 arranged between the OTDR device or instrument and the Optical Switch (OS).

Like described above, the OTDR device 310 is arranged to insert an OTDR signal between the first and second splitting stage of each and every one of the K number of power splitters.

Assume that N=4, M=8 which results in 32 ONTs per PON, wherein each PON has one OLT. Assume that K=128. This means that one OTDR instrument or device may be used for 4096 ONTs, corresponding to 128 different PONs.

Increasing values of M will result in more ONTs being, so to speak, grouped together, meaning that the back reflection or back scattering of light that is received at the OTDR-instrument or device will be the sum of the back reflection of M number of ONTs. This will require a more advanced and hence a more expensive OTDR instrument as the OTDR monitoring will become more difficult with increasing values of M. On the other hand, a high value of M will reduce the overall cost of sharing OTDRs, feeder fibres and optical switches.

The Optical Switch (OS) may be a mechanical switch. It should preferably not have any active equipment. However, in future long-reach PON applications, this might not necessarily be the case. Preferably, the OS is remotely powered and latching. Latching typically should only require power when changing output port. Various solutions are available for using the feeder fibre for a wavelength carrying power. This wavelength may require filters on both sides of the OTDR feeder fibre not to interfere with the OTDR signal, see for example FIG. 3, showing a filter 380. Also, optical filters on both ends of the OLT to splitter fibre may be used to transmit the OTDR signal, e.g. avoiding a dedicated fibre for this purpose.

According to an example of the arrangement, the OTDR device is connected to a Wavelength Division Multiplexor (WDM) with a tuneable or multi-wavelength OTDR. This is an alternative to using an OS as shown in FIGS. 2 and 3. In other words, the OS in FIGS. 2 and 3 may be replaced by a WDM.

An example of a WDM is an Arrayed Waveguide Grating (AWG) with a pass-band spectrum in the maintenance wavelength window of 1625-1675 nm.

Some examples of a method for discovering a fault and for locating the fault in a Passive Optical Network (PON), will now be described with reference to FIGS. 4 and 5 respectively. The method entails the same advantages as the arrangement already described above.

Figures 4, 5:
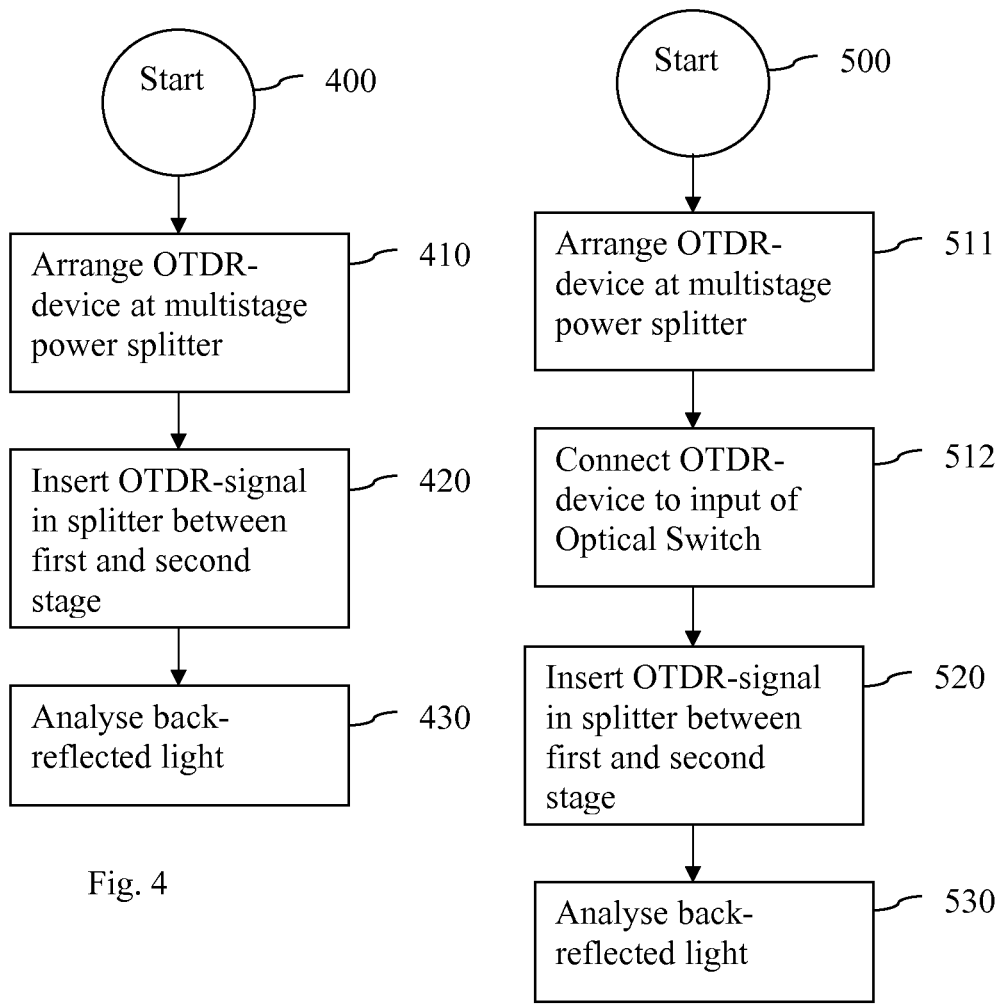
FIG. 4 is a flowchart of a method according to an embodiment.
FIG. 5 is a flowchart of a method according to another embodiment.

FIG. 4 shows a flowchart of a method comprising a step 410 of arranging/connecting an Optical Time Domain Reflectometry (OTDR) device such that it is capable of inserting an OTDR signal into a power splitter of the PON. The power splitter is a multistage stage power splitter with at least one 1:N splitter followed by N items of 2:M splitters. The method further comprises a step 420 of inserting an OTDR signal between the first stage of the at least one 1:N splitter and the second N items of 2:M splitters. Further, the method comprises a step 430 of analysing the back reflection/scattering in order to locate any possible fault in a fibre from the power splitter and the ONT.

FIG. 5 shows another example of the method comprising a step 511 of arranging/connecting an Optical Time Domain Reflectometry (OTDR) device such that it is capable of inserting an OTDR signal into a power splitter of the PON. The power splitter is a multistage stage power splitter with at least one 1:N splitter followed by N items of 2:M splitters. The method further comprises a step 512 of connecting the OTDR device to an input of an optical switch having N*K outputs connected to the inputs of the N items of 2:M splitters, wherein K is the number of Optical Line Terminals (OLT). The method also comprises a step 520 of inserting an OTDR signal between the first stage of the at least one 1:N splitter and the second N items of 2:M splitters.

The back reflection/scattering is analysed in a step 530, in order to locate any possible fault in a fibre from the power splitter and the ONT.

In a case when the power splitter is a Planar Lightwave Circuit with integrated 2:M stages, an embodiment of the method comprises inserting the OTDR signal in the splitting chain so that M≤16.

In a case when the power splitter is a Planar Lightwave Circuit with integrated 2:M stages, another embodiment of the method comprises inserting the OTDR signal in the splitting chain so that M=8.

Yet another example of the method entails connecting the OTDR-device to a Wavelength Division Multiplexor (WDM) with a tuneable or multi-wavelength OTDR.

While the invention has been described with reference to specific exemplary embodiments, the description is generally only intended to illustrate the inventive concept and should not be taken as limiting the scope of the invention. The invention is defined by the appended claims.

The invention claimed is:

1. An apparatus for fault discovery in a Passive Optical Network, comprising:
   a multistage power splitter comprising a first stage including at least one 1:N splitter followed by a second stage including N items of 2:M splitters, wherein N and M are integers greater than 1; and
   an Optical Time Domain Reflectometry (OTDR) device configured to insert an OTDR signal into the power splitter, and adapted to insert the OTDR signal between the first stage including at least one 1:N splitter and the second stage of N items of 2:M splitters;
   wherein the OTDR device is connected to an Optical Switch (OS) or a Wavelength Division Multiplexor (WDM) having one input connected to the output of the OTDR device and N*K outputs connected to the inputs of the N items of 2:M splitters, wherein K is a number of Optical Line Terminals (OLT).

2. An apparatus according to claim 1, wherein M≤16.

3. An apparatus according to claim 1, wherein M=8.

4. An apparatus according to claim 1, wherein the power splitter comprises a Planar Lightwave Circuit with integrated 2:M stages and the OTDR signal is inserted in a splitting chain of the Planar Lightwave Circuit so that M≤16.

5. An apparatus according to claim 1, wherein the power splitter comprises a Planar Lightwave Circuit with integrated 2:M stages and the OTDR signal is inserted in a splitting chain of the Planar Lightwave Circuit so that M=8.

6. An apparatus according to claim 1, wherein the Wavelength Division Multiplexor comprises an Arrayed Waveguide Grating with a maintenance wavelength window of 1625-1675 nm.

7. A method of discovering a fault in a Passive Optical Network including a plurality of Optical Line Terminals, comprising
   providing an Optical Time Domain Reflectometry (OTDR) device that it is configured to insert an OTDR signal into a power splitter of the Passive Optical Network, wherein the power splitter is a multistage power splitter comprising a first stage including at least one 1:N splitter followed by a second stage including N items of 2:M splitters;
   inserting the OTDR signal between the first stage of the at least one 1:N splitter and the second stage of the N items of 2:M splitters;
   analyzing scattering of light in the Passive Optical Network in order to locate a possible fault in a fibre in the Passive Optical Network; and
   connecting the OTDR-device to an input of an optical switch or a Wavelength Division Multiplexor (WDM) having N*K outputs connected to the inputs of the N items of 2:M splitters, wherein K is a number of the Optical Line Terminals.

8. A method according to claim 7, wherein the power splitter comprises a Planar Lightwave Circuit with integrated 2:M stages, the method comprising inserting the OTDR signal in a splitting chain of the Planar Lightwave Circuit so that M≤16.

9. A method according to claim 7, wherein the power splitter comprises a Planar Lightwave Circuit with integrated 2:M stages, the method comprises inserting the OTDR signal in a splitting chain of the Planar Lightwave Circuit so that M=8.

* * * * *